US008362993B2

(12) United States Patent
Nakagawa

(10) Patent No.: US 8,362,993 B2
(45) Date of Patent: Jan. 29, 2013

(54) LIQUID CRYSTAL DISPLAY PANEL

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 217 days.

(21) Appl. No.: 13/055,923

(22) PCT Filed: Jul. 28, 2009

(86) PCT No.: PCT/JP2009/003552
§ 371 (c)(1),
(2), (4) Date: Jan. 25, 2011

(87) PCT Pub. No.: WO2010/016197
PCT Pub. Date: Feb. 11, 2010

(65) Prior Publication Data
US 2011/0134022 A1 Jun. 9, 2011

(30) Foreign Application Priority Data

Aug. 4, 2008 (JP) ................................ 2008-200451

(51) Int. Cl.
*G09G 3/36* (2006.01)
(52) U.S. Cl. ........................... 345/87; 345/102; 349/153
(58) Field of Classification Search ................... 345/39, 345/50, 76, 82, 87, 102; 349/110, 153, 154
See application file for complete search history.

(56) References Cited

U.S. PATENT DOCUMENTS

| 6,124,917 | A | 9/2000 | Fujioka et al. |
| 6,400,439 | B1 | 6/2002 | Fujioka et al. |
| 6,661,399 | B1* | 12/2003 | Oh et al. .......................... 345/87 |
| 6,882,398 | B2 | 4/2005 | Watanabe et al. |
| 7,710,519 | B2* | 5/2010 | Okuda ............................ 349/110 |
| 2002/0119633 | A1* | 8/2002 | Yamazaki et al. ............ 438/308 |
| 2002/0163615 | A1 | 11/2002 | Fujioka et al. |
| 2004/0027528 | A1* | 2/2004 | Nam et al. ..................... 349/153 |

(Continued)

FOREIGN PATENT DOCUMENTS

| JP | 10-206862 A | 8/1998 |
| JP | 2002-122870 A | 4/2002 |

(Continued)

OTHER PUBLICATIONS

International Search Report (ISR) issued in PCT/JP2009/003552 (International application) mailed in Aug. 2009 for Examiner consideration, citing U.S. Patent Nos. 1-3, U.S. Patent Application Publication Nos. 1, 4-6 and Foreign Patent document Nos. 2-5 listed above.

*Primary Examiner* — Joe H Cheng
(74) *Attorney, Agent, or Firm* — Chen Yoshimura LLP

(57) ABSTRACT

The present invention provides a liquid crystal display panel having a narrower frame region than in the conventional art. The liquid crystal display device of the present invention includes a liquid crystal layer 42 interposed between a first substrate 10 and a second substrate 20, and a sealant portion 32 that surrounds the liquid crystal layer, the sealant portion 32 being made of a sealant containing a photocurable resin and conductive beads. The first substrate 10 includes a recess 14*a* in which an organic insulating film 14 is not present in a non-display region. At least a portion of a black matrix 22*a* overlaps the recess 14*a*. A portion of the sealant portion 32 is disposed in the recess 14*a*. An opposite electrode 24 is not formed in a region of the second substrate 20 that faces the recess 14*a*.

4 Claims, 5 Drawing Sheets

U.S. PATENT DOCUMENTS

| | | |
|---|---|---|
| 2005/0012888 A1 | 1/2005 | Fujioka et al. |
| 2005/0151920 A1 | 7/2005 | Watanabe et al. |
| 2006/0012735 A1 | 1/2006 | Yamada et al. |
| 2006/0038937 A1* | 2/2006 | Kaneko et al. ............... 349/110 |
| 2007/0177073 A1* | 8/2007 | Seo et al. ..................... 349/110 |
| 2009/0195738 A1 | 8/2009 | Yamada et al. |
| 2009/0231523 A1* | 9/2009 | Matsumoto et al. ......... 349/110 |
| 2010/0277683 A1 | 11/2010 | Yamada et al. |
| 2010/0289997 A1* | 11/2010 | Suzuki ......................... 349/158 |
| 2011/0134352 A1* | 6/2011 | Nakagawa .................... 349/43 |

FOREIGN PATENT DOCUMENTS

| | | |
|---|---|---|
| JP | 2003-43462 A | 2/2003 |
| JP | 2006-53518 A | 2/2006 |
| WO | 2007/110995 A1 | 10/2007 |

* cited by examiner (a)

(b)

(a)

(b)

(a)

(b)

LIQUID CRYSTAL DISPLAY PANEL

TECHNICAL FIELD

The present invention relates to a liquid crystal display panel. More particularly, the present invention relates to a liquid crystal display panel manufactured using the one-drop filling method.

BACKGROUND ART

As larger-sized liquid crystal display panels have come to be widely used in recent years, the one-drop filling (ODF) method for forming a liquid crystal layer between a pair of substrates is replacing the conventional vacuum injection method. The one-drop filling method includes the following steps:
(1) On one of the pair substrates, a pattern is formed using a sealant, surrounding the region in which the liquid crystal layer is to be formed. The sealant pattern is formed by drawing a pattern using the sealant supplied by, for example, a dispenser.
(2) A liquid crystal material is dropped in the region surrounded by the sealant pattern.
(3) Under a low pressure atmosphere, the other substrate is bonded on the aforementioned substrate with the liquid crystal material interposed therebetween. Then the sealant is cured.

Since the pattern formed of the sealant must completely surround the region in which the liquid crystal layer is to be formed with the one-drop filling method, at least one joint must be formed in the sealant pattern.

Characteristics of the sealant pattern formed with the one-drop filling method will be described with reference to FIG. 3.

FIG. 3 shows an example of four pieces of liquid crystal display panels manufactured using a mother substrate. The mother substrate 20 includes four opposite substrates (typically, color filter substrates), and each display region 20D includes an opposite electrode (not shown) and color filters (not shown) arranged with the corresponding pixels. The same reference numeral is used for the mother substrate and the opposite substrate. Furthermore, the opposite substrate 20 includes a black matrix (light shielding layer) 22, which surrounds the display region 20D, and the black matrix 22 defines the outer edges of the display region 20D. Although FIG. 3 illustrates TFT substrates 10 as separated for each liquid crystal display panel, actually, a mother substrate having four TFT substrates 10 thereon, similar to the case with the mother substrate 20, is prepared and coupled to the mother substrate 20. Necessary circuit elements, including TFTs, pixel electrodes, gate signal wiring, and source signal wiring, for example, are formed on each display region 10D of the four TFT substrates 10, respectively. The TFT substrate 10 and the opposite substrate 20 are fixed to each other by a sealant portion 32. The sealant portion 32 is formed outside the black matrix 22. Glass substrates for the TFT substrate 10 and the opposite substrate 20, are referred to as "glass substrate 11" and "glass substrate 21," respectively.

A portion outside the display region 10D or 20D on the liquid crystal display panel is called a non-display region (or a frame region) and is preferably made as narrow as possible. The black matrix 22 and the sealant portion 32 are disposed in the non-display region.

On the other hand, the black matrix 22 must have enough width in order to prevent any extraneous light from entering the display regions 10D and 20D. Inadequate light shielding would lower the quality of the black color display and have a significant effect on the image quality. In order to satisfy both of these requirements, the sealant portion 32 must be formed very close to the outer edges of the black matrix 22 with a high degree of precision.

The sealant portion 32 formed by the drawing method, however, includes at least one joint portion 32b. This joint portion 32b of the sealant tends to become thicker than a sealant extension portion 32a. Here, the sealant extension portion 32a refers to the sealant portion excluding the joint portion 32b, and the width of the sealant extension portion 32a is fairly constant. The extension portion 32a is where a sealant pattern is drawn with a sealant using a nozzle of a dispenser, for example, as it moves relative to the substrate surface. Therefore, the resulting width of the sealant extension portion 32a is determined by the rate of deposition of the sealant and the speed of the nozzle movement. For this reason, the width of the extension portion 32a is stable. On the other hand, the joint portion 32b includes a portion where the sealant is first deposited (sealant pattern start point). The amount of sealant initially deposited on the start point depends on the amount of the sealant that has accumulated at the tip of the nozzle. This, in turn, is affected by a variation in the time required for positioning the nozzle (including height positioning) and a variation in the amount of sealant left in the nozzle tip when the nozzle leaves the substrate at the end point of the sealant pattern. Since the amount of sealant deposited at the start/end points of a sealant pattern drawing is variable as described above, and a joint must be formed there, the width of the joint portion 32b tends to become wider than that of the extension portion 32a.

FIG. 4(a) and FIG. 4(b) are enlarged views of the sealant joint portion and its vicinity. FIG. 4(a) is a plan view, and FIG. 4(b) is a cross-sectional view taken along the line 4B-4B' in FIG. 4(a).

As described above, when the sealant pattern becomes wide at the joint portion 32b, that portion of the sealant pattern can overlap the black matrix 22. Sealants containing photocurable resin (including those that are also thermally curable) are widely used, and when such sealant is exposed to radiation (typically ultraviolet (UV) radiation) from the side of the opposite substrate 20, a portion 32' of the sealant that overlaps the black matrix 22 is not adequately cured, and as a result, the uncured components of the photocurable resin can dissolve into the liquid crystal material. Such dissolved components, in particular ionic components, can cause a reduced reliability of the liquid crystal display panel, such as decreased ability to hold voltages and alignment failure.

Furthermore, the sealant pattern width tends to become wider at corners of a sealant pattern, because the movement of a nozzle of a dispenser, for example, slows down there. Therefore, the problem that a portion 32' of the sealant that overlaps the black matrix 22 as shown in FIG. 5(a) and FIG. 5(b) cannot be adequately cured sometimes occurs at the corner portions of the sealant patterns as well. Here, FIG. 5(a) and FIG. 5(b) are enlarged views of a corner portion of a sealant pattern and its vicinity. FIG. 5(a) is a plan view, and FIG. 5(b) is a cross-sectional view taken along the line 5B-5B' of FIG. 5(a).

The inventor of the present invention disclosed in Patent Document 2 a liquid crystal display device in which the width of the sealant pattern is prevented from becoming wider by providing a region(s) having an extra space between a CF substrate and a TFT substrate (hereinafter "wide-gap region") at the joint portion of the sealant pattern or at the corners of the sealant pattern. The wide-gap regions are formed by providing a recess(es) in the surface of the opposite substrate or the TFT substrate, on the side facing the liquid crystal layer. In the wide-gap region(s), a portion of the sealant is absorbed inside the recess(es), which prevents the sealant from spreading inward on the substrate surface. An example of the method for forming a recess on the surface of the substrate is disclosed, in which a recess(es) or a through hole(s) is(are) made at a predetermined location(s) on a resin film formed on the TFT substrate. The entire contents of Patent Document 2 are hereby incorporated by reference.

RELATED ART DOCUMENTS

Patent Documents

Patent Document 1: Japanese Patent Application Laid-Open Publication No. 2002-122870
Patent Document 2: Japanese Patent Application Laid-Open Publication No. 2006-53518

SUMMARY OF THE INVENTION

Problems to be Solved by the Invention

The method described in Patent Document 2, however, is based on the assumption that light (UV) radiates from the side of the opposite substrate for curing the sealant, and the case in which the black matrix is formed on the sealant portion on the opposite substrate is not discussed in the description. That is, if the frame region of the liquid crystal display panel is made even narrower, a structure in which at least a portion of the black matrix on the opposite substrate overlaps the sealant portion will be needed. Patent Document 2, however, does not describe the structure of a sealant portion or manufacturing method thereof in such a case.

The present invention has been devised in consideration of the various points discussed above, and is aiming at providing a liquid crystal display panel having a narrower frame portion than in the conventional art.

Means of Solving the Problems

The liquid crystal display panel of the present invention has a first substrate including a transparent substrate, a plurality of pixel electrodes, a plurality of wirings, and an organic insulating film covering the aforementioned plurality of wirings; a second substrate including a second transparent substrate, a black matrix, and an opposite electrode; a liquid crystal layer interposed between the aforementioned first substrate and the aforementioned second substrate; and a sealant portion surrounding the aforementioned liquid crystal layer, the aforementioned sealant portion being made of a sealant containing a photocurable resin and conductive beads, wherein the liquid crystal display panel has a display region and a non-display region surrounding the aforementioned display region. The aforementioned first substrate includes a recess in which the aforementioned organic insulating film is not present in the aforementioned non-display region; at least a portion of the aforementioned black matrix overlaps the aforementioned recess; a portion of the aforementioned sealant portion is disposed in the aforementioned recess; and the aforementioned opposite electrode is not formed on a region of the aforementioned second substrate that faces the aforementioned recess.

In an embodiment, the aforementioned plurality of wirings have an opening portion where the aforementioned plurality of wirings overlap the aforementioned sealant portion.

In another embodiment, the aforementioned black matrix overlaps the entirety of the aforementioned sealant portion.

In another embodiment, the aforementioned portion of the aforementioned sealant portion formed in the aforementioned recess includes a joint or corner portion of the sealant pattern.

Effects of the Invention

According to the present invention, in a liquid crystal display device panel having a structure in which at least a portion of a black matrix on a second substrate (opposite substrate) overlaps the sealant portion, the width of a sealant pattern is prevented from becoming wider at, for example, joint or corner portions of the sealant pattern, where the width of the sealant pattern tends to become wider. As a result, the present invention can provide a liquid crystal display panel having a narrower frame region than in the conventional art.

Even when the recess for preventing the sealant portion from becoming wider is formed by partially removing the organic insulating film covering the wirings, the wirings do not short-circuit to the opposite electrode, because the opposite electrode is not formed in the region facing the recess.

When the openings (slits) are provided on the wirings, a sealant can be adequately cured with light radiating from the side of the first substrate on which the wirings are formed.

The sealant can be adequately cured with light radiating from the side of the first substrate, even when the black matrix on the second substrate is formed to overlap the entire sealant portion. As a result, the frame of the liquid crystal display panel can be made narrower than in the conventional art.

BRIEF DESCRIPTION OF THE DRAWINGS

FIG. 1(a) is a schematic cross-sectional view of the frame region of a liquid crystal panel display panel 100A, and FIG. 1(b) is a schematic cross-sectional view of the frame region of a liquid crystal display panel 100B.

FIG. 4(a) is a plan view, and FIG. 4(b) is a cross-sectional view taken along the line 4B-4B' in FIG. 4(a).

FIG. 5(a) is a plan view, and FIG. 5(b) is a cross-sectional view taken along the line 5B-5B' in FIG. 5(a).

DETAILED DESCRIPTION OF EMBODIMENTS

The structures of the liquid crystal display panel according to preferred embodiments of the present invention will be described below with reference to the drawings. It should be noted that the present invention is not limited to the preferred embodiments in the examples below.

Figure 1:
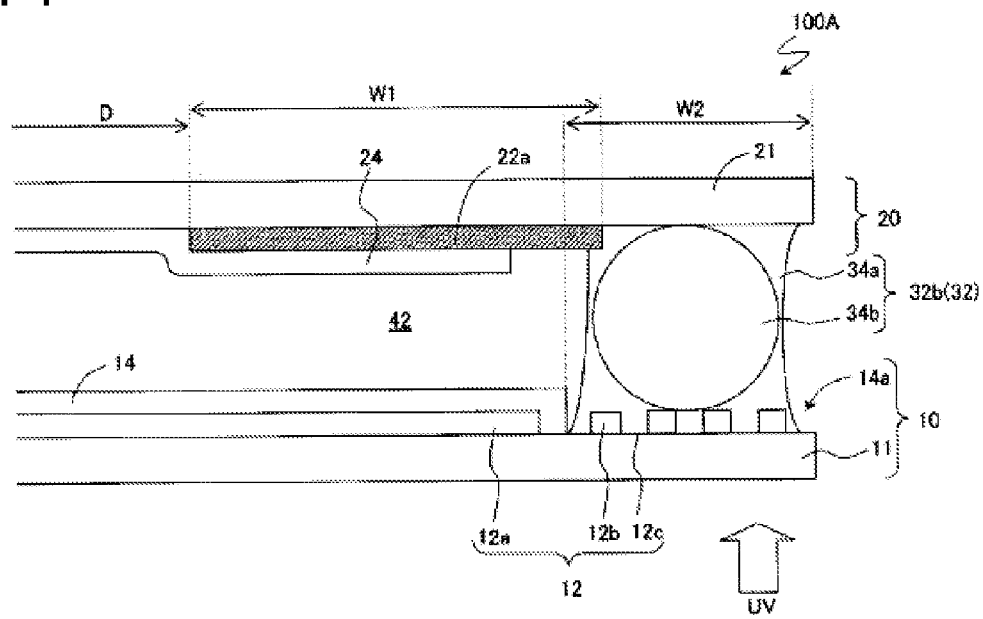
FIG. 1 shows schematic diagrams of the liquid crystal display panel according to embodiments of the present invention.
Figure 1:
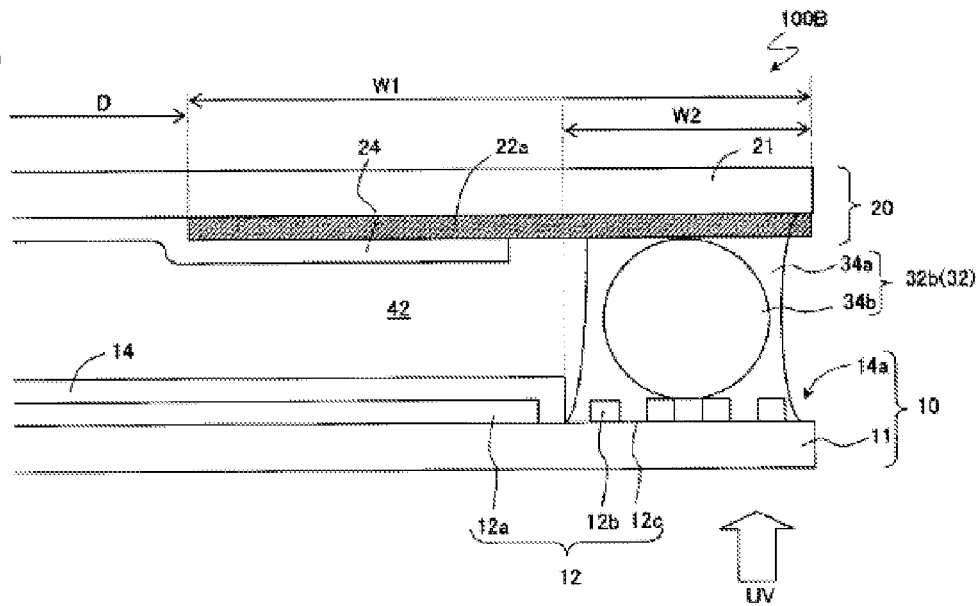
Figure 2:
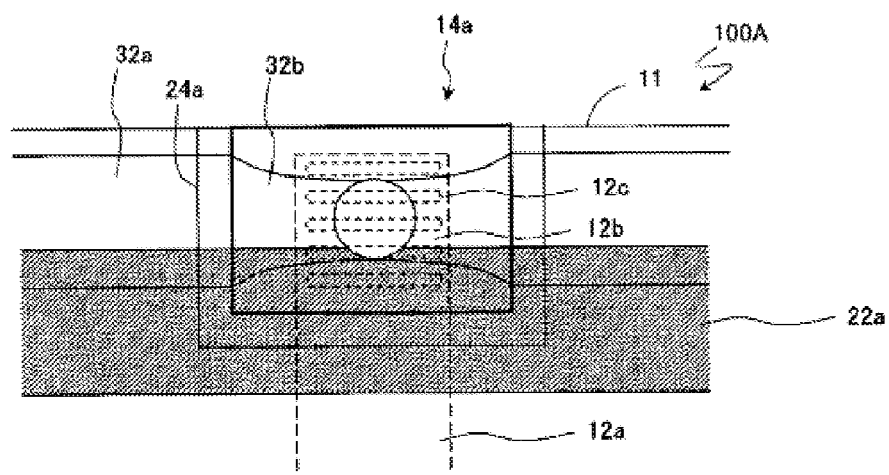
FIG. 2(a) and FIG. 2(b) are schematic plan views of the frame region of the liquid crystal display panel 100A.
Figure 2:
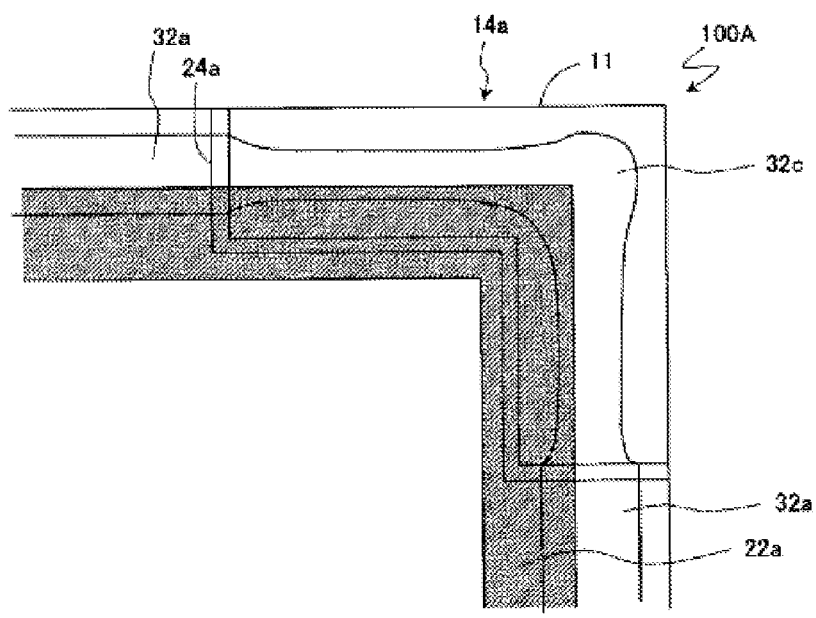

FIG. 1 and FIG. 2 are schematic views illustrating the structure of frame regions of liquid crystal display panels according to preferred embodiments of the present invention.

FIG. 1(a) is a schematic cross-sectional view of the frame region of a liquid crystal display panel 100A, and FIG. 2(a) and FIG. 2(b) are schematic plan views of the frame region of the liquid crystal display panel 100A. FIG. 2(a) includes a sealant joint portion 32b, and FIG. 2(b) includes a sealant corner portion 32c.

The liquid crystal display panel 100A, shown in FIG. 1(a), FIG. 2(a), and FIG. 2(b), includes a TFT substrate 10, an opposite substrate 20, and a liquid crystal layer 42 interposed between the TFT substrate 10 and the opposite substrate 20.

The TFT substrate 10 includes a glass substrate 11, a plurality of pixel electrodes (not shown), a plurality of wirings 12, and an organic insulating film 14 covering the plurality of wirings 12. The pixel electrodes are formed on the organic insulating film 14, for example. The wirings 12 are, for example, gate bus lines, source bus lines, and CS bus lines (auxiliary capacitance bus lines). The pixel electrode is connected to the source bus line through the TFT (not shown). Furthermore, an alignment film (not shown) is formed over almost the entire surface of the TFT substrate 10 on the side facing the liquid crystal layer 42.

The opposite substrate 20 includes a glass substrate 21, a black matrix (a light shielding layer) 22a, and an opposite electrode 24. A color filter layer (not shown) is disposed on the opposite substrate 20 as needed. Furthermore, an alignment film (not shown) is formed over almost the entire surface of the opposite substrate 20 on the side facing the liquid crystal layer 42.

Figure 3:
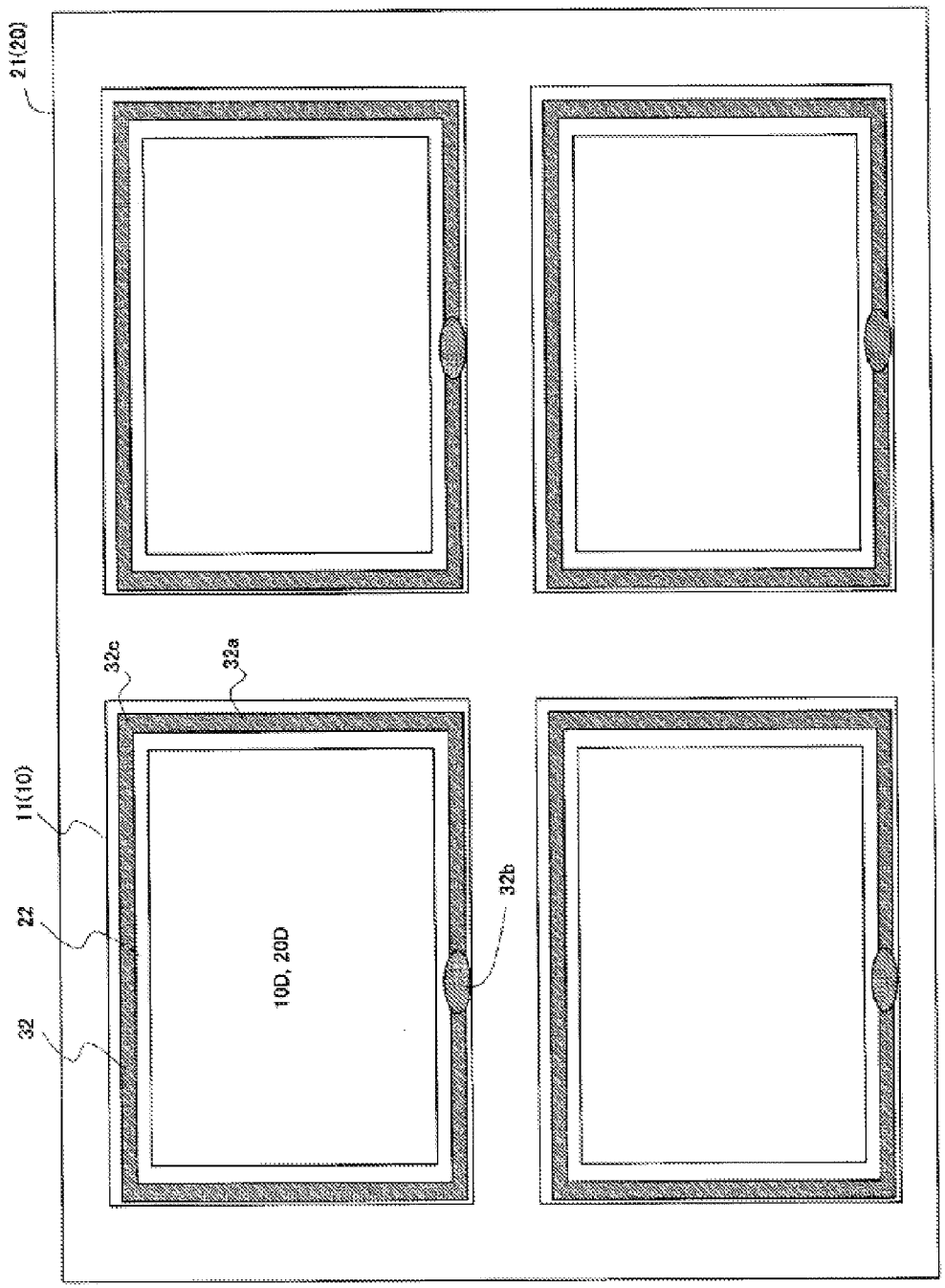
FIG. 3 is a diagram showing the characteristics of the sealant pattern formed with the one-drop filling method.

The liquid crystal layer 42 interposed between the TFT substrate 10 and the opposite substrate 20 is surrounded by a sealant portion 32, similar to FIG. 3. The sealant portion 32 is formed of a sealant containing a photocurable resin 34a and conductive beads 34b. Here, the conductive beads 34b are mixed into the sealant in order to function as a "Common" transfer contact (common voltage transfer section). The conductive beads 34b, which are present between a predetermined terminal section (common terminal section) on the TFT substrate 10 and the opposite electrode 24, function as the common transfer contact.

The TFT substrate 10 includes a recess 14a, in which the organic insulating film 14 is not present, in the non-display region. A portion of the black matrix 22a on the opposite substrate 20 overlaps the recess 14a, and a sealant joint portion 32b is disposed in the recess 14a. On the other hand, the opposite electrode 24 is not formed on a region of the opposite substrate 20 that faces the recess 14a. In other words, a portion of the opposite electrode 24 is notched (a notched portion 24a). As a result, even when an end portion 12b of the wiring 12 is exposed in the recess 14a, and the conductive beads 34b are contained in the sealant portion 32 in the recess 14a, short circuits between the wiring 12 and the opposite electrode 24 are prevented.

Furthermore, even when a portion of the black matrix 22a on the opposite substrate 20 overlaps the sealant portion 32, the photocurable resin 34a in the sealant portion 32 can be cured by radiating light from the side of the TFT substrate 10. Here, when the wirings 12 are wide, the sealant portion 32 may not be adequately exposed to the light. For this reason, openings (slits) 12c are preferably formed in the end portions 12b of the wirings 12, when the end portions 12b overlap the sealant portion 32.

Adoption of a structure in which the openings 12c are formed in the end portions 12b of the wirings 12 allows employment of a structure in which the black matrix 22a overlaps the entire sealant portion 32, such as the structure of a liquid crystal display panel 100B shown in FIG. 1(b). The liquid crystal display panel 100B can have a frame region whose width is even narrower than that of the liquid crystal display panel 100A.

The widths of the frame regions of the liquid crystal display panels 100A and 100B will be discussed below.

Figure 4:
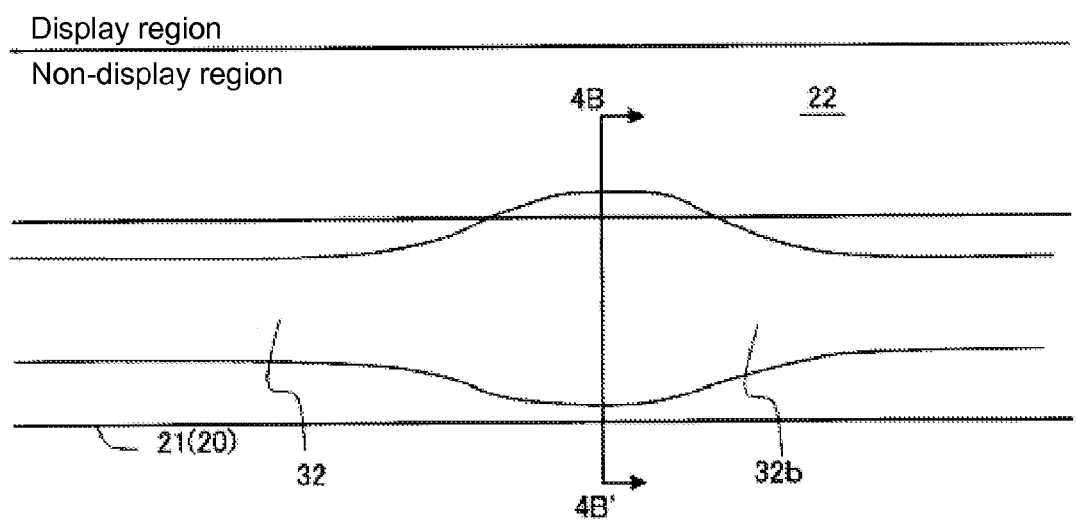
FIG. 4(a) and FIG. 4(b) are enlarged views of a sealant joint portion and the vicinity thereof.
Figure 4:
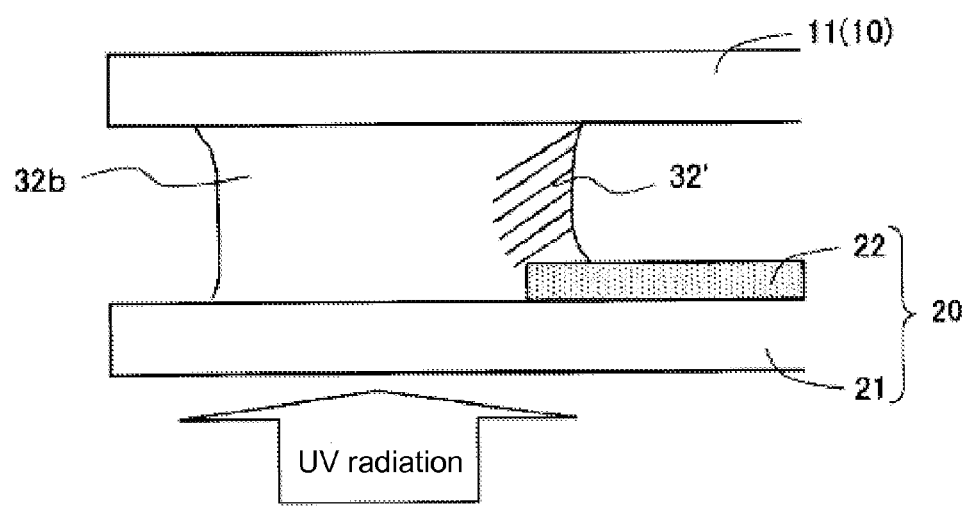
Figure 5:
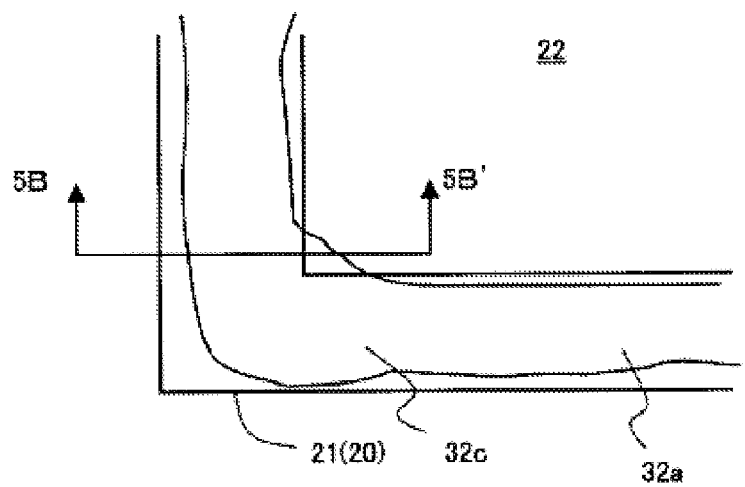
FIG. 5(a) and FIG. 5(b) are enlarged views of the sealant corner portion and the vicinity thereof.
Figure 5:
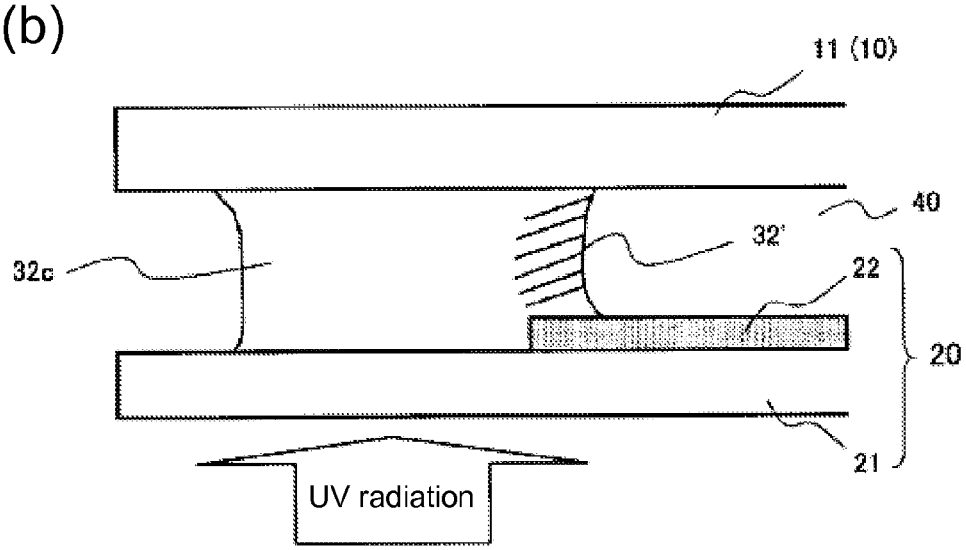

In the conventional liquid crystal display panels, shown in FIG. 3, the sealant portion 32 is formed in a region which does not overlap the black matrix 22. The problem with the conventional technology was that when the sealant portion becomes wider at the joint portion 32b shown in FIG. 4 and at the corner portion 32c shown in FIG. 5, a portion 32' at which the radiation is blocked by the black matrix 22 is formed, and the portion 32' remains uncured. On the other hand, the technology described in Patent Document 2 prevents the sealant pattern from becoming wide by forming wide gap regions at the joint portion 32b and the corner portions 32c.

The technology described in Patent Document 2, however, requires that the sealant portion 32 be formed in such a way as not to overlap the black matrix 22, meaning that the frame region cannot be made narrower.

FIG. 1(a) is referenced now. The technology of Patent Document 2 requires the sealant portion 32 to be formed in a region that does not overlap the black matrix 22a. Therefore, both width W1 and width W2 must be reserved for the black matrix 22a and the sealant portion 32, respectively, outside the display region D. In other words, although the recess 14a formed on the TFT substrate 10 prevents the sealant pattern from becoming wide at the joint portion 32b and the corner portion 32c in a manner similar to that shown in FIG. 2(a) and FIG. 2(b), the frame region cannot be narrower than the combined width of W1+W2. Here, the width W1 of the black matrix 22a needs to be at least, for example, 3 mm for preventing any stray light from entering the liquid crystal layer 42 in the display region D, and the width W2 of the sealant portion 32 is, for example, 1000 μm to ensure adequate adhesion strength.

On the other hand, the liquid crystal display panel 100A shown in FIG. 1(a), FIG. 2(a), and FIG. 2(b) includes a recess 14a formed on the TFT substrate 10, which prevents the sealant pattern from becoming wide at the joint portion 32b and the corner portions 32c, and has the black matrix 22a disposed in such a way as to partially overlap the sealant portion 32 (32b, 32c). As a result, a frame region narrower than a combined width of W1+W2 becomes possible. Furthermore, with the structure of the liquid crystal display panel 100B shown in FIG. 1(b) in which the black matrix 22a overlaps the entire sealant portion 32, a frame region having a width that is equal to W1 can be realized.

Furthermore, with a structure in which the black matrix 22a simply overlaps a portion or the entirety of the sealant portion 32, a short circuit can occur between the opposite electrode 24, which is generally formed over the entire surface of the opposite substrate 20, and the wirings 12. Such short circuit, however, does not occur in the liquid crystal display panels 100A and 100B, since the opposite electrode is not formed in the region facing the recess 14a Here, the photocurable resin 34a used in the sealant is typically a UV curable resin. However, the sealant is not limited to this, and may be a resin which is curable by exposure to light of other wavelengths (for example, visible light). Furthermore, the photocurable resin refers to a resin that undergoes a curing reaction when exposed to light of a particular wavelength, and also encompasses those resins that can be further cured by heat after being cured by light. A combination with thermal curing generally enhances the post-curing material properties (hardness and coefficient of elasticity). Furthermore, the sealant may contain particles for enhancing the scattering of light (a filler) as well as photocurable resin. A sealant in which such particles are scattered promotes the scattering or diffusion reflection of light, which allows light to spread across a wider area within the sealant. The conductive beads 34b may be, for example, gold-plated plastic beads.

INDUSTRIAL APPLICABILITY

The present invention is preferably used for liquid crystal display panels, and particularly for liquid crystal display panels manufactured using the one-drop filling method.

DESCRIPTION OF REFERENCE NUMERALS

10 TFT substrate (TFT mother substrate)
11, 21 glass substrate (transparent substrate)
12, 12a wirings
12b end portions of wirings
12c openings (slits)
14 organic insulating film
14a recess (portion in which the organic insulating film is not present)
20 opposite substrate (CF mother substrate)
22a black matrix
24 opposite electrode
24a notch in the opposite electrode
32 sealant portion
32a sealant extension portion
32b sealant joint portion
32c sealant corner portion
34a photocurable resin
34b conductive beads
42 liquid crystal layer

The invention claimed is:

1. A liquid crystal display panel comprising:
a first substrate including a transparent substrate, a plurality of pixel electrodes, a plurality of wirings, and an organic insulating film covering said plurality of wirings;
a second substrate including a second transparent substrate, a black matrix, and an opposite electrode;
a liquid crystal layer interposed between said first substrate and said second substrate; and
a sealant portion surrounding said liquid crystal layer, said sealant portion being made of a sealant containing a photocurable resin and conductive beads,
wherein the liquid crystal display panel has a display region and a non-display region surrounding said display region, and
wherein said first substrate includes a recess in which said organic insulating film is not present in said non-display region; at least a portion of said black matrix overlaps said recess; a portion of said sealant portion is disposed in said recess; and said opposite electrode is not formed on a region of said second substrate that faces said recess.

2. The liquid crystal display panel according to claim 1, wherein said plurality of wirings have an opening portion where said plurality of wirings overlap said sealant portion.

3. The liquid crystal display panel according to claim 1, wherein said black matrix overlaps an entirety of said sealant portion.

4. The liquid crystal display panel according to claim 1, wherein said portion of said sealant portion formed in said recess includes a joint portion or corner portion of said sealant portion.

* * * * *